March 1, 1966  R. BRANDT  3,237,449
FORCE MEASURING DEVICE
Filed Aug. 28, 1962
5 Sheets-Sheet 1

INVENTOR:
Ralph Brandt

Smyth, Roston & Pavitt
Attorneys

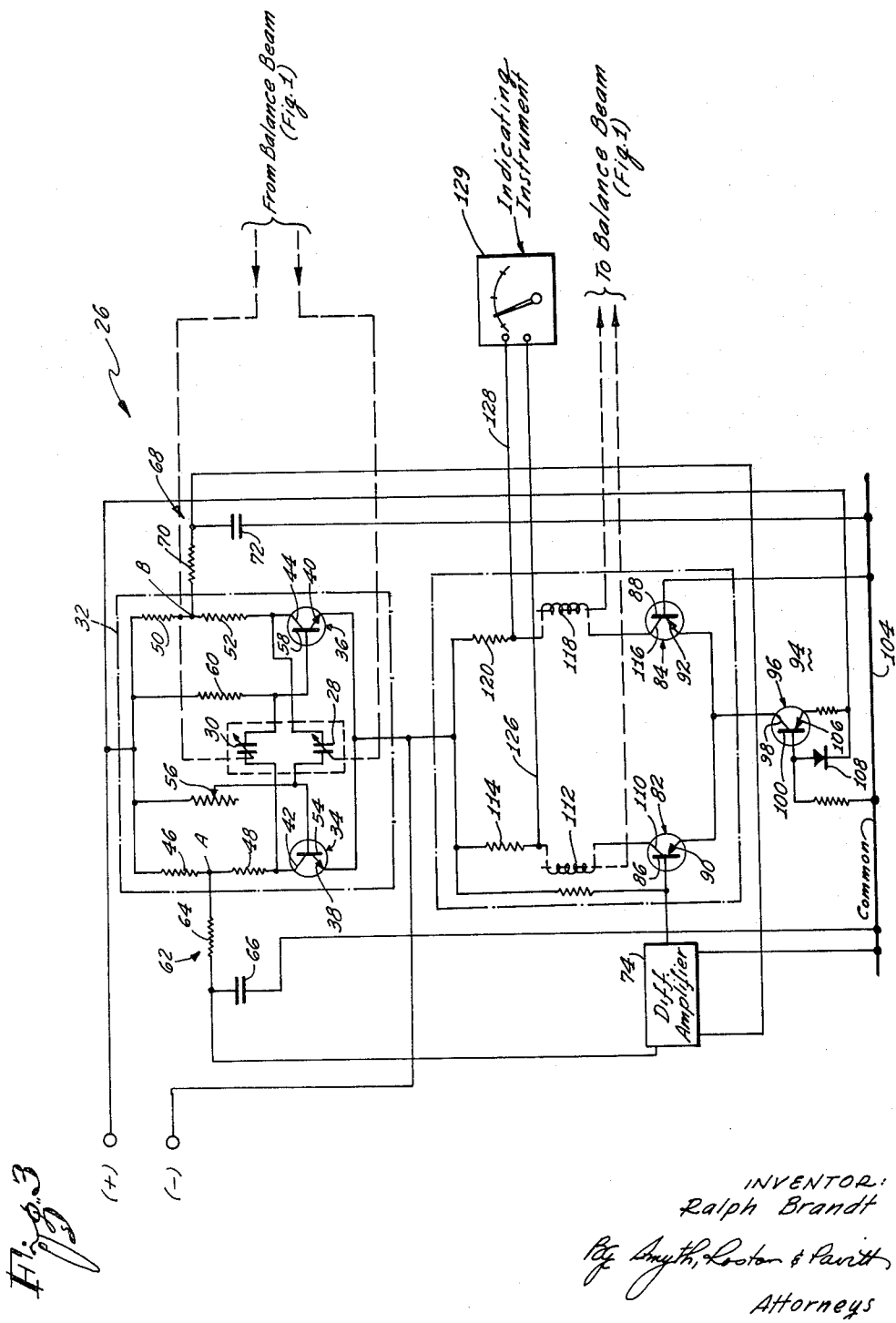

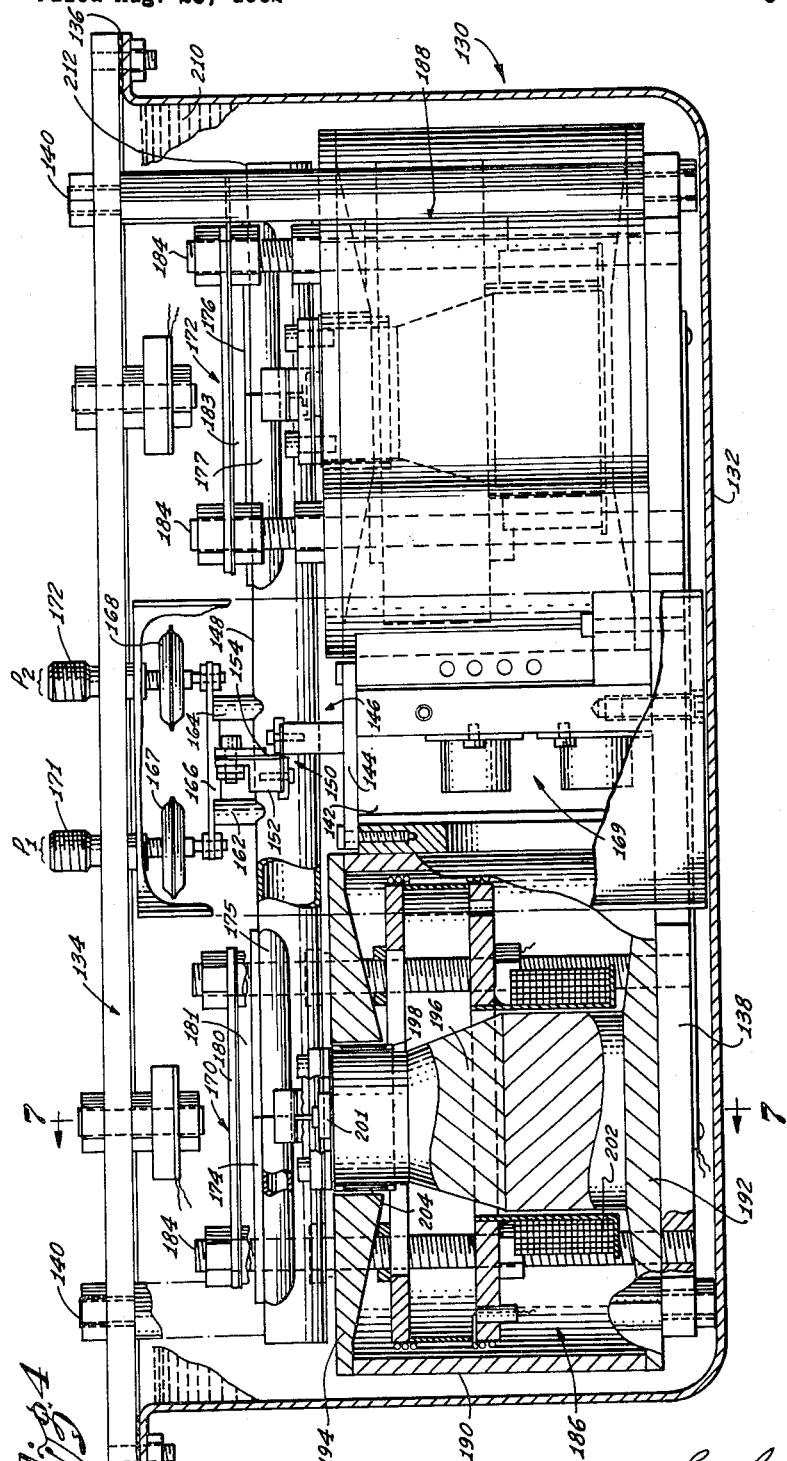

March 1, 1966 R. BRANDT 3,237,449
FORCE MEASURING DEVICE
Filed Aug. 28, 1962 5 Sheets-Sheet 4

INVENTOR:
Ralph Brandt

By Smyth, Roston & Pavitt
Attorneys

March 1, 1966 R. BRANDT 3,237,449
FORCE MEASURING DEVICE
Filed Aug. 28, 1962 5 Sheets-Sheet 5

INVENTOR:
Ralph Brandt
By Smyth, Roston & Pavitt
Attorneys

United States Patent Office 3,237,449
Patented Mar. 1, 1966

3,237,449
FORCE MEASURING DEVICE
Ralph Brandt, 6048 W. 74th St., Los Angeles, Calif.
Filed Aug. 28, 1962, Ser. No. 219,886
8 Claims. (Cl. 73—141)

The present invention relates to measuring instruments and more particularly to means for measuring the differences between a plurality of forces.

It is very frequently desirable to be able to accurately measure a force or to measure the difference between a pair of forces. One means of accomplishing this is to provide a measuring instrument or transducer having a member against which the force may act whereby the member will be deflected through a distance proportional to the magnitude of the force. Thus, by ascertaining the amount of deflection of the member, it is possible to determine the magnitude of the force. Such means are effective to indicate the magnitude of the force; however, since it is necessary for the member to be displaced, there is a certain amount of mechanical friction and hysteresis that will materially affect the accuracy of the indications. Although there are numerous transducers having means for reducing the amount of movement of the member to a minimum, they have not only been very complicated and expensive, but have also possessed certain amounts of friction and hysteresis.

It is now proposed to provide a transducer for measuring forces which will overcome the foregoing difficulties. More particularly, it is proposed to provide a transducer which will facilitate measuring the magnitude of one or more forces with a high degree of precision and repeatability. This is to be accomplished by providing a transducer having a balance beam with one or more load-supporting portions thereon. A force to be measured may operate on one of these load-supporting portions to produce a turning moment on the beam proportional to the force. If two forces are to be compared, there are two load-supporting portions symmetrically disposed about the fulcrum of the beam so that the two forces may operate to produce opposing moments on the beam. This will cause a resultant moment to be present on the beam proportional to the difference between the two forces. One or more pickup means such as a capacitance may have one of the sides operatively connected to the balanced beam so as to produce an error signal proportional to the displacement of the beam.

One or more servo-motors are also connected to the beam and are responsive to the error signal so as to exert a restoring moment on the beam. This will cause the error signal to be reduced to a minimum whereby the beam will be maintained in a null position. The amount of force required to maintain the beam in this null position will then be indicative of the amount of original unbalance in the beam. Accordingly, the extent to which the servo-motors are energized will be effective to indicate the amount of original unbalance produced by the two forces. Since the servo-motors will be effective to virtually eliminate any mechanical motion of the beam, the effects of mechanical hysteresis and friction are virtually eliminated from the transducer whereby very precise and repeatable measurements may be made.

These and other features and advantages of the present invention will become readily apparent from reading the following detailed description, particularly when taken in connection with the accompanying drawings wherein like reference numerals refer to like parts, and wherein:

FIGURE 3 is a schematic diagram of control means employed in the embodiment of FIGURE 1;

FIGURE 4 is a transverse cross-sectional view of an instrument embodying another form of the invention;

Figure 1:
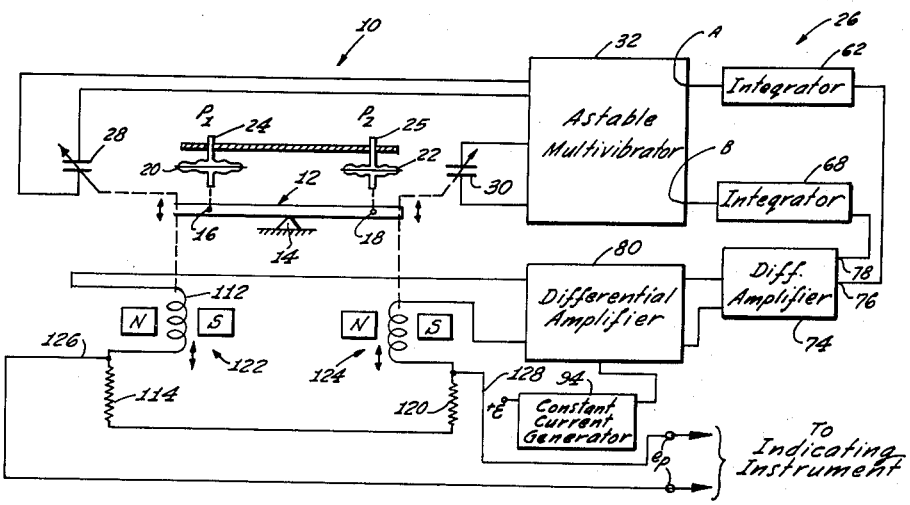
FIGURE 1 is a schematic block diagram of a measuring instrument embodying one form of the present invention.
Figure 2:
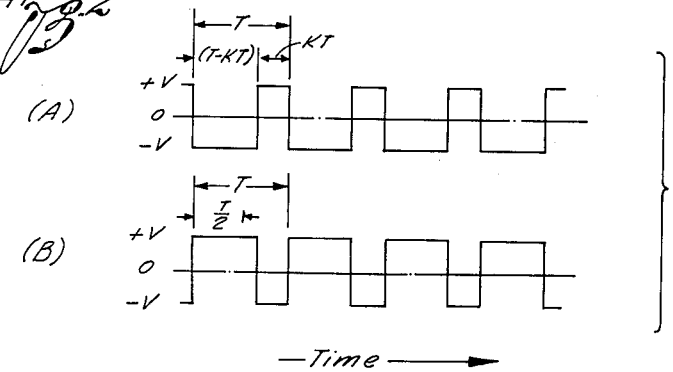
FIGURE 2 is a showing of a series of waveforms of signals present in various portions of the system of FIGURE 1.

Referring to the drawings in more detail, and particularly to FIGURES 1, 2 and 3 thereof, the present invention is particularly adapted to be employed in a system for measuring the magnitude of one or more forces or measuring the amount of difference between two forces. Although the forces to be measured may result from a wide variety of effects, the present system is responsive to the forces created by two gas pressures P1 and P2.

More particularly, the present system is embodied in a measuring instrument 10 utilizing a balance beam 12 which is pivotally supported by a fulcrum 14. The fulcrum 14 is preferably of a low friction variety that will permit the beam to swing freely with a minimum amount of mechanical hysteresis or friction. In addition, it is desirable for the fulcrum to constrain the beam 12 against any other form of motion.

The beam 12 includes an elongated member that is statically and dynamically balanced about the axis of the fulcrum 14. A pair of load-supporting portions 16 and 18 are provided on the beam 12 for applying the forces to the beam 12. The portions are preferably symmetrically disposed about the axis of rotation so that the forces will have similar effects. As a consequence, if the forces acting on the load portions are equal, they will produce turning moments or torques on the beam that are equal and the beam will remain balanced. As previously stated, in the present instance, the forces to be measured are proportional to gas pressures P1 and P2. Accordingly, pressure-responsive devices such as a bellows capsule or diaphragm chamber 20 and 22 may be mechanically connected to the load-supporting portions 16 and 18. The interiors of the capsules may have the interiors thereof connected to conduits 24 and 25 leading to the sources of the pressures P1 and P2.

It will thus be seen that the first gas pressure P1 will produce a turning moment on the beam 12 which will tend to cause the beam to rotate about the fulcrum in proportion to the magnitudes of the pressure P1, and the second gas pressure P2 will produce a second turning moment on the beam 12 which will tend to cause the beam to rotate about the fulcrum in proportion to the magnitude of the pressure P2. If the two pressures P1 and P2 are equal, the two turning moments will be equal and the beam will remain in a fixed position. However, in the event there is a difference between the pressures P1 and P2, the two turning moments will be unequal and a resultant turning moment will be produced on the beam 12. This resultant turning moment will tend to rotate the beam 12 about the axis of the fulcrum in proportion to the difference between the two pressures P1 and P2.

In order to permit determining the amount of unbalance or resultant turning moment on the beam 12, means may be provided that will produce an electrical signal proportional to this moment. Although there are a wide variety of means suitable for accomplishing this objective, in the present instance, they include a servo system 26 that will sense any motion of the beam and generate a restoring moment or torque that will tend to maintain the beam in its original or null position. At the same time, the servo will produce an electrical signal that is proportional to the restoring moment and therefore proportional to the difference between the two pressures P1 and P2.

The servo system includes suitable means for sensing the movement of the beam 12. In the present instance, this means includes a pair of sensor condensers 28 and 30 that are positioned adjacent to the ends of the beam 12 so that their capacitances will vary with the motion of the beam. More particularly, each condenser 28 and 30 is formed by a pair of parallel plates, one of which is mounted on the beam to move therewith and the other of which is mounted in a fixed position. As a consequence, whenever the beam 12 rotates about the fulcrum 14, the plate on one end of the beam will approach its mate and increase the capacitance of that condenser while the plate on the opposite end of the beam will recede from its mate and decrease the capacitance of that condenser. Accordingly, as long as the beam 12 remains in a balanced or null position, the capacitances will be equal, but as soon as the beam begins to move, the two capacitances of the two condensers 28 and 30 will change in opposite directions.

Although the changes in the capacitances of the condensers 28 and 30 may be detected in any suitable manner, in the present instance, they are incorporated into an astable or free-running multivibrator 32 in such a manner that one or more of the time constants of the multivibrator will be determined by the capacitances of the condensers 28 and 30. The present multivibrator 32 includes a pair of symmetrically disposed transistors 34 and 36 that may be alternatively conductive. The emitters 38 and 40 of each of these transistors 34 and 36 are connected together and to a source of negative potential. The collector 42 of the first transistor 34 is connected to a source of positive potential by means of a pair of load resistors 46 and 48. Similarly, the collector 44 of the second transistor 36 is connected to the positive source by a second pair of load resistors 50 and 52. The base 54 of the first transistor 34 is connected to the positive source by means of a variable potentiometer 56 and to the collector 44 of the second transistor 36 by means of the sensor condenser 28 and the base 58 of the second transistor 36 is connected to the positive source by a fixed resistor 60 and to the collector 42 of the first transistor 34 by the sensor condenser 30.

It will thus be seen that when the collector in one transistor is conducting, the other transistor will be biased beyond cut-off and no current will flow through its collector. As a result, the voltages present at the junction between one pair of load resistors will be high potential and the potential at the junction between the other pair of load resistors will be low.

More particularly, if the collector 42 of the first transistor 34 is conducting, there will be a drop across the load resistors 46 and 48 and the sensor condenser will tend to acquire a charge corresponding to the difference between the negative and positive sources. As the condenser 30 becomes charged, the voltage drop across the resistor 60 will decrease and eventually the potential on the base 58 of the transistor 36 will rise beyond the cut-off level. The collector 44 in the transistor 36 will then commerce conducting. The instant this occurs the voltage drop across the load resistors 50 and 52 will increase and the voltage of the collector 44 will drop. The sensor condenser 28 will then begin to charge and there will be a large drop across the potentiometer 56. This will lower the potential at the base 54 of the transistor 34 so as to cause the transistor 34 to be cut off. As this charging continues, the potential at the base 54 will increase until the transistor 34 is conductive again and the transistor 36 is cut-off. It will thus be seen that the two transistors 34 and 36 will be alternatively conductive and the potentials at the junction points A and B between load resistors 48-46 and load resistors 50 and 52 will correspond to the wave-trains shown in FIGURE 2. It should also be noted that the interval that each transistor is conductive will be determined by the capacitance of the sensor condensers 28 and 30.

If the beam 12 is balanced and is positioned such that the capacitances of the sensor condensers 34 and 36 are substantially identical, the variable potentiometer 56 may be adjusted so that the transistors 34 and 36 will each be cut off or not conductive for identical intervals. Then, if the beam becomes unbalanced and tends to swing in one direction, the capacitance of one sensor condenser will increase and the capacitance of the other sensor condenser will decrease. When this condition occurs, the time constants of the two sides of the multivibrator 32 will change and one of the transistors will conduct for an extended interval and be cut off for a short interval. Conversely, the other transistor will be cut off for an extended interval and conduct for a short interval. The potential at point A will correspond to the waveform shown in FIGURE 2a and the potential at point B will correspond to the waveform in FIGURE 2b. If the period of the multivibrator 32 is equal to T, the point A will have a high potential for the period KT and a low potential for a period $(1-K)T$. Conversely, the point B will have a low potential for the period KT and a high potential for the period $(1-K)T$ where K is some constant between 0 and 1. Thus, the intervals of conduction and cut-off will be determined by the amount that the displacement of the beam 12 charges the capacitances.

Point A at the center of the load resistors 46–48 may be interconnected with an integrator 62 having a serially connected resistor 64 and a by-pass condenser 66. When the transistor 34 is cut off, the condenser 66 will tend to charge this positive line voltage. However, when the transistor is conducting, condenser 66 will tend to discharge to a lower potential. As a consequence, the condenser 66 will accumulate a D.C. charge corresponding to the length of the interval that the transistor 34 is turned on.

Point B at the center of the load resistors 50–52 may be interconnected with a second integrating circuit 68 having a resistor 70 and a condenser 72. This condenser 72 will thus acquire a charge corresponding to the length of the interval that the transistor 36 is turned on.

Assume the transistor 34 goes into saturation at time 0; and also assume that resistors 46 and 64 have equal values of resistance R in ohms and that resistor 48 has a resistance of $R/2$ in ohms. Assume capacitor 66 has a capacitance of C farad. Then, the voltage across the capacitor 66 at some time $t$ after transistor turn on, and before the transistor turns off again, can be expressed by the equation $$f(t) - v(0) - \left[\frac{V}{3} + v(0)\right][1 - \exp(-3t/4RC)] \quad (1)$$

Assume the transistor 34 turns off at time 0; then, the voltage across the capacitor 66 at some time $t$ after transistor turn off, and before the transistor turns on again, can be expressed by the equation $$v(t) = v(0) + [V - v(0)][1 - \exp(-t/2RC)] \quad (2)$$

The period T of the astable multivibrator is the time between successive turn-offs or successive turn-ons of either transistor 34 or 36. Assume $k$ to be a number between 0 and 1 and to express that portion of a period that one of the transistors is turned on. Then it can be said that the transistor is on for $kT$ second and off $(1-k)T$ second. The gain of the astable multivibrator and the associated integrators can be expressed as the change of voltage across capacitor 66 or 72 as a function of $k$. If the voltage across the capacitor 66 has reached steady state, it can be stated that $$v(nT) = v(n-1T) \quad (3)$$

where $n$ is some integer.

Substituting appropriate values of $t$ into equations (1) and (2), and using (3), we get the following equations:

$$v(nT) = v([n-1+k]T) + [1-\exp(-[1-k]T/2RC)][V - v([n-1+k]T)] \quad (4)$$

$$v([n-1+k]T) = v([n-1]T) + [1-\exp(-3kT/4RC)][-V/3 - v([n-1]T)] \quad (5)$$

To simplify further equations, make the following substitutions:

$$v([n-1]T) = v_1 \quad (6.1)$$
$$v([n-1+k]T) = v_2 \quad (6.2)$$
$$v(nT) = v_3 \quad (6.3)$$
$$1-\exp(-[1-k]T/2RC) = a \quad (6.4)$$
$$1-\exp(-3kT/4RC) = b \quad (6.5)$$

Then the following development can be made:

$$v_3 = v_2 + a(V - v_2) \quad (7)$$
$$v_2 = v_1 + b(-N/3 - v_1) \quad (8)$$
$$v_1 = v_3 \quad (9)$$

$$v_1 = (1-a)\left[(-b)v_i - \frac{bV}{3}\right] + aV$$

$$= -\left[\frac{b(1-a)}{3} - a\right]V \div [1-(1-a)(1-b)] \quad (10)$$

$$= \frac{a - \frac{b}{3} + \frac{ab}{3}}{a+b-ab}V$$

Some approximations can be made. If $x$ is .01 or less, then the expression $1-\exp(-x)$ is approximately equal to $x$. Using this approximation in (6.4) and (6.5), and neglecting the terms in (10) involving the product $ab$, we have $$v_1 = \frac{a - \frac{b}{3}}{a+b}V$$

$$= \frac{\frac{(1-k)T}{2RC} - \frac{3kT}{3(4RC)}}{\frac{(1-k)T}{2RC} + \frac{3kT}{4RC}}V = \frac{2-3k}{2+k}V \quad (11)$$

It is thus seen, that within the realm of validity of the approximations, the voltage across either integrating capacitor 66 or 72 is independent of the period of the astable multivibrator and a function only of the portion, $k$, of the period that one of the transistors is turned on. A quick check makes this evident. If $k=0$ in (11), i.e., the transistor is always off, $v_1 = +V$. If $k=1$, i.e., the transistor is always on, $$v_1 = \frac{V}{3}$$

The output from the integrator 62 is interconnected with one side 76 of the multi-stage D.C. differential amplifier 74 while the output from the integrator 68 is interconnected with the opposite side 78 of the differential amplifier 74. This amplifier 74 may be of a conventional variety having the two sides thereof symmetrically arranged to amplify only the difference between the signals on the two sides and to reject or suppress all common mode signals, i.e., signals that are present in both sides.

The outputs of the two sides 76 and 78 of the differential amplifier 74 are connected to a final or power stage 80 of the differential amplification. This stage 80 includes a pair of transistors 82 and 84 that are symmetrically disposed with respect to each other. The base 86 of the first transistor 82 is operatively interconnected with the output from the differential amplifier 74 and the base 88 of the second transistor 84 is connected to a common or floating ground 104. The two emitters 90 and 92 are connected to each other and to a constant current generator 94. The present generator 94 includes a transistor 96 having the collector 98 connected to the emitters 90 and 92 of the two transistors 82 and 84. The base 100 is connected to a resistor 102 that leads to a common floating ground 104 while the emitter 106 is connected to the positive source through a resistor. A Zener diode 108 is connected between the base 100 and positive source so as to effectively regulate the voltage across the emitter resistor and the emitter-base junction. This, in turn, will maintain a constant current through the collector 98.

The collector 110 of the first transistor 82 is connected to a first pair of loads 112 and 114 that lead to the source of negative potential. The collector 116 of the second transistor 84 is connected to a second pair of loads 118 and 120 similar to the first pair of loads and leading to the source of negative potential. The currents through the two pairs of loads are thus controlled by the biases on the bases 86 and 88 and the difference between the two currents will be proportional to the difference between the signals on the opposite sides 76 and 78 of the amplifier 74.

It may thus be seen that as the beam 12 is displaced from its balanced or null position, the capacitances of the two condensers 28 and 30 will become unbalanced. This will produce a corresponding unbalance in the multivibrator 32 whereby the two squarewaves will charge. The integrators 62 and 68 will integrate these squarewaves and produce D.C. signals having a difference therebetween that is proportional to the amount of displacement of the beam 12. This difference will be amplified in the amplifier 74 and produce currents in the pairs of loads 112–114 and 118–120 that have a difference corresponding to the original displacement of the beam 12.

In order to maintain the beam 12 as close as possible to its balanced or null position, the two loads 112 and 118 may be incorporated into a pair of servo motors 122 and 124 that are operatively interconnected with the beam 12 for applying a restoring moment or torque thereto. In the present instance, each of the motors 122 and 124 is a thrust device that will produce a linear force proportional to the magnitude of the current flow. More particularly, each of the loads 112 and 118 are inductances or coils that are wound so as to produce a pair of substantially identical flux fields. Each of the coils is movably disposed in a magnetic flux field such that a current in the coil will result in an axially directed force on the coil. Although the flux field may be produced by any suitable means, in the present instance, permanent magnets are employed so as to eliminate the need for an additional power supply, etc.

The two coils 112 and 118 are movably disposed in the flux fields and are operatively interconnected with the balance beam 12 by a suitable means. The thrust produced by the coils will thus act against the beam in opposition to the resultant torque or moment on the beam 12. The coils are preferably attached to the beam 12 at points symmetrically disposed about the axis of the fulcrum so that they will be of identical effectiveness.

It may thus be seen that the currents flowing through the coils 112 and 118 will correspond to the current from the transistors 82 and 84. These currents will be effective to react with the flux fields from the magnets and produce a thrust which will act upon the beam 12 in opposition to the forces on the load bearing portions 16 and 18. Since the difference between the two currents from the transistors 34 and 36 will be proportional to the amount of displacement of the beam 12, these forces will cause the beam to be biased toward its original position with a sufficient force to overcome the original unbalancing moment produced by the pressure differentials. This will maintain the beam 12 in a substantially constant position. As a consequence, there will be little if any mechanical friction or hysteresis that will in any way interfere with the accuracy of the restoring forces. In order to permit an observer to determine the amount of unbalance, conductors 126 and 128 may be connected between the loads 118 and 120 and the loads 112 and 114 and an indicating meter. This meter 129 will thus sense the voltage differential between these two points. Since the currents flowing through the resistors will produce corresponding voltage drops, this voltage differential will be proportional to the original unbalancing forces. Accordingly, the meter 129 may be calibrated in units suitable for indicating the differences between the pressures P1 and P2.

Although the foregoing measuring instrument 10 is effective to indicate the difference between a pair of pressures P1 and P2, under some circumstances it may be desirable to employ the embodiment of FIGURES 4 to 8, inclusive. In this embodiment, the instrument 130 is completely contained within an hermetically sealed enclosure. The present enclosure includes a housing 132 having an opening on top and a cover 134 which may be secured to the housing 132 to close the opening. In addition, it may be desirable to provide a resilient sealing gasket 136 between the housing 132 and cover 134 to insure an effective seal.

The operative elements of the instrument 130 are carried by a base plate 138 which is secured to the cover 134 by a plurality of vertical bolts 140. The base plate 138 will thus be suspended from the cover 134 and inside of the housing 132 adjacent the bottom thereof.

In order to support at least a portion of the elements of the instrument 130, a support structure is secured to the base plate 138 adjacent its center so as to project upwardly toward the cover 134. The present support structure includes a plurality of vertical arch sections 141, a plurality of sections 142 and a platform 144 that extends across the top of the sections 142. The channel sections 142 may be arranged to form a space into which the various electrical components may be disposed, as will be described subsequently.

The platform 144 may have a fulcrum 146 secured thereon for pivotally supporting a balanced beam 148 in position adjacent the top of the housing 132. Although the fulcrum 146 may be of any suitable variety, in the present instance, it includes a first block 150 secured to the platform 144 with a pair of arms that project upwardly along the opposite sides of the beam 148. These arms have plane faces disposed substantially coincident with the center of the beam 148. A second block 152 is secured to the beam 148 so that plane faces on the side thereof will be substantially coplanar with the faces on the first block 150. A pair of vertical reeds or leaf springs 154 may be secured to the substantially aligned faces of the blocks 150 and 152, thereby resiliently supporting the beam 148. In addition, a second set of horizontal leaf springs 156 may be secured to another set of aligned faces on the two blocks 150 and 152. It will thus be seen that the beam 148 will be supported by two sets of crossed leaf springs 154 and 156. This will permit the beam 148 to swing about an axis coincident with the crossings of the leaf springs 154 and 156 with a minimum amount of friction but will prevent the beam moving in any other manner.

The beam 148 is preferably constructed of a hollow member such as an aluminum tube whereby it will have a minimum weight and moment of inertia about the axis of the fulcrum. A pair of load-supporting portions 158 and 160 may be provided on the beam 148 substantially symmetrically about the axis of rotation. Although the portions 158 and 160 may be of any variety suitable for supporting the type of forces to be compared, in the present instance, a pair of tubular brackets 162 and 164 are secured to the beam 148 to extend upwardly therefrom. A secondary beam 166 is secured to the upper ends of the brackets 162 and 164 substantially parallel to the balanced beam 148 and extending beyond the ends of the brackets 162 and 164. Since it is desired to measure the difference between a pair of gas pressures, a pressure responsive device such as a bellows or diaphragm chamber 167 and 168 is operatively attached to each end of the secondary beam 166. In addition, each of the bellows or diaphragm chambers 167 and 168 are secured to the cover 134 so as to be able to react thereagainst. Conduits communicating with the interior of the chambers 167 and 168 may extend upwardly through the cover 134 and terminate at nipples 171 and 173. These nipples may be interconnected with sources of the two pressures P1 and P2 to be compared.

It may thus be seen that if the sources of the pressures P1 and P2 are connected to the nipples 171 and 173, the bellows diaphragm chambers 167 and 168 will be effective to react against the secondary beam 166 and produce forces proportional to the amount of pressure. These forces will then be transmitted through the tubular brackets 162 and 164 to the balanced beam 148. The difference between these two forces will produce a resultant turning moment or torque on the beam 148 that will tend to cause the balance beam 148 to swing about the axis formed at the crossing of the leaf springs 154 and 156. The magnitude of this resultant turning moment or torque will, of course, be proportional to the difference between the two pressures P1 and P2.

In order to detect and measure the effect of the resultant moment on the beam 148, a servo control system 169 may be provided that will produce a restoring moment or torque on the beam 148 that will tend to maintain the balanced beam 148 in its balanced or null position. At the same time, the system 169 will produce an electrical signal having a magnitude proportional to the amount of the restoring moment so that a visual indication thereof may be provided. Although the servo system 169 may employ a wide variety of means for detecting any movement of the beam 148, in this embodiment, sensor condensers 170 and 172 are provided on the ends of the beam 148. These condensers 170 and 172 correspond to the condensers 28 and 30 in the first embodiment. More particularly, each of the condensers 170 and 172 has a movable plate 174 or 176 secured to the beam by suitable supports 175 and 177 such that the plates will move with the beam. The present supports 175 and 177 include a plurality of tubular members 178 that are attached to the beam 148 in diamond-shaped configurations. Each of the plates 174 and 176 may be secured to the member 178 by a dielectric material such as an epoxy resin. As a consequence, the plates 174 and 176 will be electrically isolated from the balanced beam 148 and its supporting structure.

Each of the condensers 170 and 172 also include stationary plates 180 and 182 that are supported immediately to the movable plates 174 and 176. The movable plates 174 and 176 and the stationary plates 180 and 182 are separated from each other by spaces 181 and 183 to insure capacitances therebetween. In the present instance, the insulated plates 180 and 182 are supported by a plurality of studs 184 that are secured to the base plate 138. The pairs of plates 174 and 180 and the pair of plates 176 and 182 will thus form the sensor condensers 170 and 172 and the capacitances thereof will be determined by the sizes of the spaces 181 and 183 therebetween.

It may thus be seen that the pressures P1 and P2 present in the bellows or diaphragm chambers 167 and 168 will tend to rotate the beam 148 about the axis formed by the leaf springs 154 and 156 and increase the capacitance of one condenser and decrease the capacitance of the other condenser. In order to insure that the beam 148 rotates only about the axis of the fulcrum, it may be desirable to provide additional leaf springs 184 at the ends of the beam 148. This will prevent the ends of the beam 148 moving in any direction other than pure rotation in a plane normal to the axis of the fulcrum. As a consequence, if the beam 148 is statically and dynamically balanced about the axis of rotation, translation of the instrument 130 in any direction will have little or no effect on the position of the beam 148. In addition, if the instrument 130 is rotated, only that component of rotation that is parallel to the plane of rotation will tend to cause any movement of the balance beam 148. Rotation in any other planes will not affect the beam 148.

The two sensor condensers 170 and 172 may be included in the servo system 169 to be effective to produce error signals proportional to the displacement of the balanced beam 148. Although the servo system may be of any desired variety, it is substantially the same as in the first embodiment. More particularly, the two sensor condensers 170 and 172 form portions of the timing circuit in a free-running or a stable multivibrator that produces a pair of squarewaves. The durations of the pulses in the squarewaves correspond to the fluctuations in the capacitances of the sensor condensers 170 and 172. The squarewaves are then integrated to provide a pair of D.C. signals having a difference therebetween which is proportional to the variations in the pulse durations of squarewaves and, therefore, proportional to the deflections of the beam 148. These D.C. signals are then amplified to produce a pair of electrical currents proportional to the deflection of the beam 148.

In order to utilize these currents for applying a restoring torque to the beam 148, separate thrust motors 186 and 188 may be provided for each end of the beam 148. In the present instance, each of these thrust motors 186 and 188 is adapted to produce an axially directed force which is proportional to the amount of current that is being fed therethrough. Although there are a wide variety of thrust motors suitable for this application, in the present instance each of the thrust motors 186 and 188 includes a stator 189 which is adapted to be mounted on the base plate 138 and an armature 191 which is adapted to react with the stator to produce the desired force. Each of the stators includes a magnetically permeable, outer shell consisting of a hollow cylinder 190, a base 192, a cover 194, and a central core 196. All of these parts are rigidly secured together to form a closed loop magnetic flux circuit. The core 196 may be secured to the center of the base 192 so as to project upwardly therefrom toward the cover 194 to form an air gap 198 for the armature 191. The center of the cover 194 preferably includes an aperture that has a circular interior surface 200. The upper end of the core may be disposed in this aperture. The interior surface 200 of the aperture has a diameter which is slightly greater than the diameter of the external surface of the core 196. As a consequence, these two surfaces register with each other and the air gap will have an annular configuration of substantially uniform dimensions. As a consequence, magnetic flux in this circuit will flow radially across the air gap with a substantially uniform density.

Although the flux may be generated by any suitable means, it has been found desirable to employ permanent magnets as this will insure a substantially steady flux density and will eliminate the necessity for additional power supplies that would be required by an electromagnetic source. The permanent magnet may be created by permanently magnetizing one or more of the shell members prior to the assembly of the shell. However, it has been found desirable to provide a coil 202 on the base plate substantially concentric with the core 196. After the shell has been assembled, a current may be driven through the coil 202 to permanently magnetize the shell. This will permit the shell to be magnetized to provide a very precisely controlled residual flux in the magnet. In addition, it will permit the amount of residual magnetization to be changed so that the sensitivity of the instrument 130 can be modified.

The armatures 191 for the thrust motors 186 and 188 consist of a hollow shell. Each shell has a cylindrical configuration whereby the armature may be reciprocably disposed within an air gap 198 substantially concentric with the two pole faces. The armature 191 is preferably a lightweight member so as to reduce its affects on the moment of inertia of the balanced beam 148. The armature 191 may be secured to a bracket 201 that is fastened onto the bottom of the balanced beam whereby the armature will move with the balanced beam as it pivots about its axis.

Each of the armatures 191 may have a coil 204 wound circumferentially therearound to form an inductive load which will correspond to the inductances 112 and 118 in the first embodiment. Each of these windings 204 may then be included in the suitable servo control system 169 whereby the currents corresponding to the amount of resultant torque being applied to the beam 148 will flow therethrough. In addition, resistive loads 206 corresponding to the resistive loads 114 and 120 in the first embodiment may be interconnected in series with the windings 204 on the armatures 191. The current flow through windings 204 will thus produce voltage signals thereacross proportional to the pressure differential.

Since a certain amount of energy will be expended in these resistive loads 206, they will tend to dissipate appreciable quantities of heat. In order to minimize the unbalancing effects which might be produced by such heat, the resistive load for each coil in the first thrust motor may be disposed in the opposite thrust motor. If the resistances of the loads 206 and the coils 204 are substantially equal and if the total current flow is constant, even though the current may be divided unequally between the two coils 204, the amount of heat in each of the thrust motors will be substantially constant. This will insure the two motors being of identical temperatures. Thus, the thermal expansions of the air gaps 198 will be identical.

It will thus be seen that as the pressures P1 and P2 are applied to the bellows or diaphragm chambers 167 and 168, they will produce forces on the balanced beam 148 which will tend to cause the beam 148 to pivot about the axis formed by the fulcrum 146. The amount of the resultant torque producing this turning motion will be proportional to the difference between the two pressures P1 and P2. The motion of the beam 148 will cause the capacitance of the sensor condensers 170 and 172 to vary and produce electrical currents in the thrust motors 186 and 188 whereby a restoring torque will be applied to the beam 148 that will maintain the beam in its balanced or null position. In addition, the currents through the coils or the voltage drop produced by the currents' flow through the resistances 206 will be effective to actuate a meter for producing a reading indicative of the amount of the pressure differential. Since there will be little, if any, motion of the beam 148, there will be little, if any, mechanical friction or hysteresis which will interfere with the accuracy of the reading or the repeatability thereof.

Under some circumstances, it has been found desirable to fill the housing 132 with a liquid 210 whereby all of the operative elements of the instrument 130 will be completely immersed in the liquid 210. Although the liquid 210 should substantially fill the entire housing 132, it is desirable to leave a small gas pocket 212. This will permit the liquid 210 to expand and contract as the temperature changes. In addition, if the pressures P1 or P2 cause any changes in the total displacements of the bellows or diaphragm chambers 177 and 178, the liquid may expand into the gas pocket 212.

In addition to completely immersing all of the operative elements, the liquid will fill the spaces 181 and 183 between the plates 180–174 and 182–176. Since the movable plates 174 and 176 must move through a liquid, they will act like paddles and produce a very effective viscous damping action. As a consequence, the overall gain of the servo portion 169 may be made extremely high without producing instability. Moreover, by employing a liquid having a dielectric constant that is greater than air, the capacitances of the sensor condensers 170 and 172 can be increased. This, in turn, will permit a high gain and more accuracy.

Another advantage that can be derived from the use of a liquid is to reduce the weight on the fulcrum 146, etc. This may be accomplished by sealing the ends of the beam 148 with plugs 212 so that the buoyancy of the beam 148 can be made substantially equal to the weight of the beam and the appurtenances. As a consequence of this neutral buoyancy, there will be little, if any, loading on the supporting springs and the mechanical friction and hysteresis will be further reduced.

Figure 8:
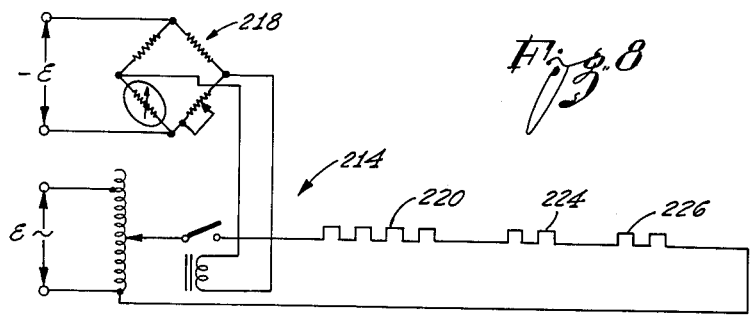
FIGURE 8 is a schematic diagram of means for controlling the temperature of the instrument of FIGURE 4.
Figure 5:
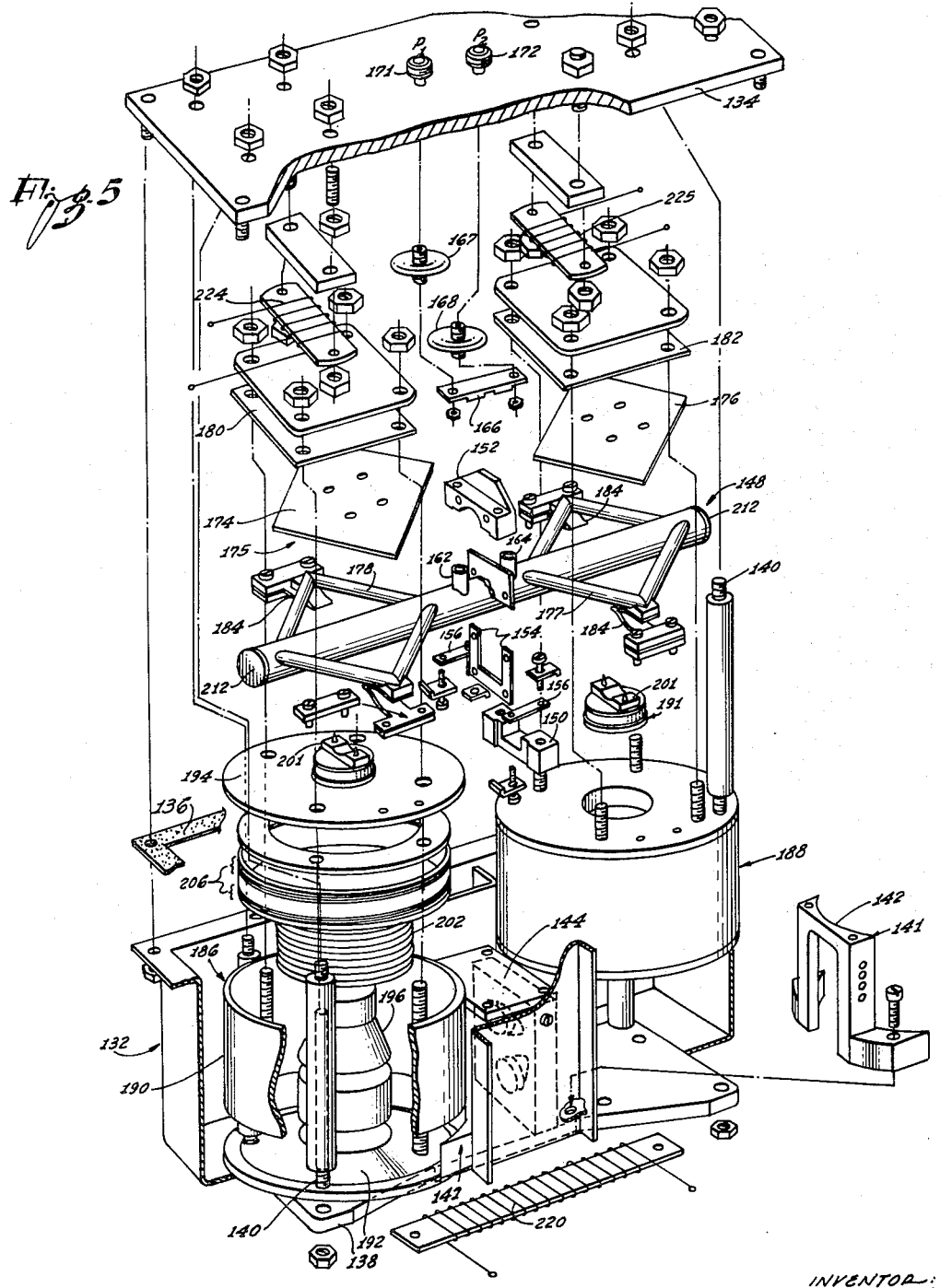
FIGURE 5 is an exploded perspective view of the instrument of FIGURE 4.
Figure 6:
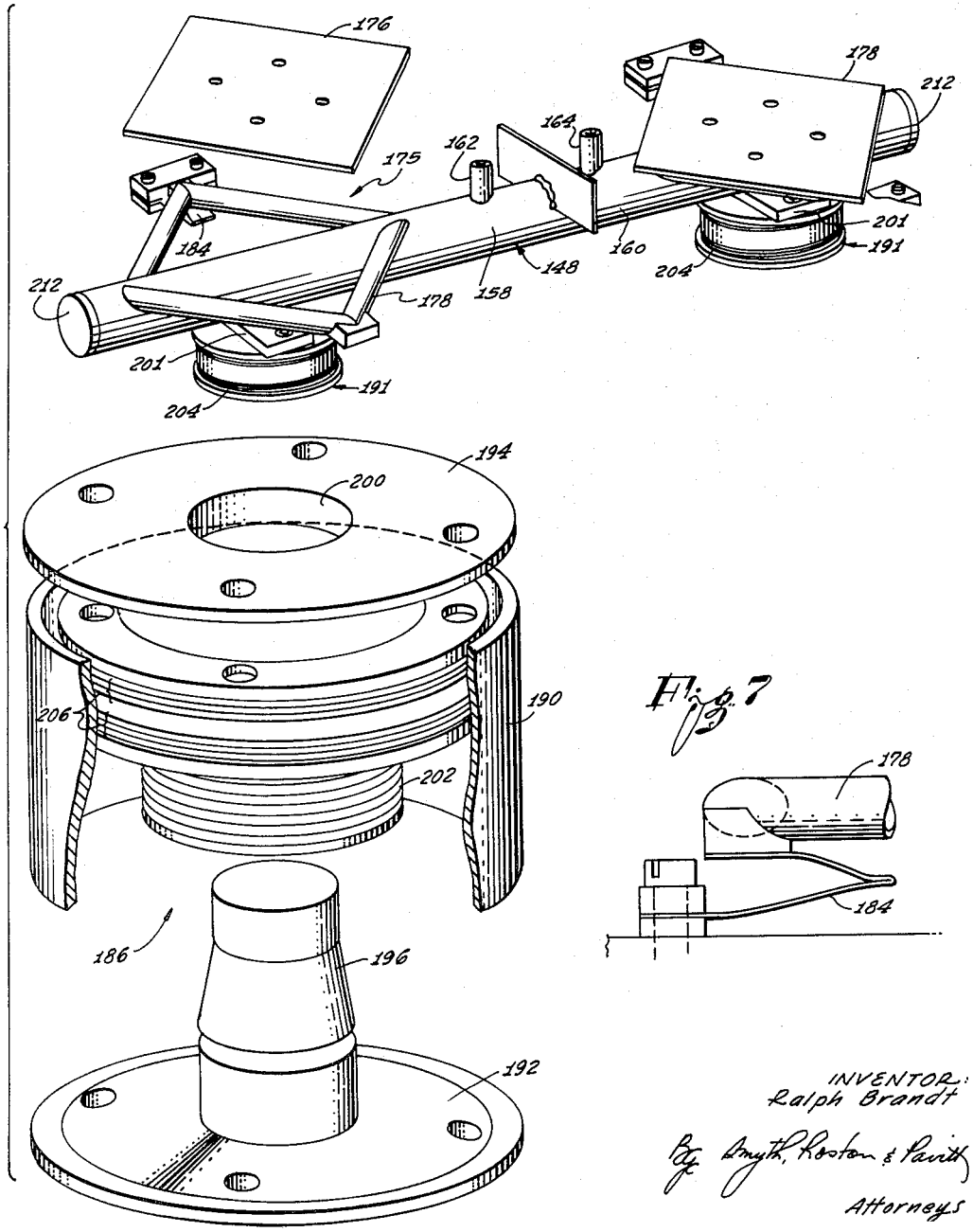
FIGURE 6 is an exploded perspective view on an enlarged scale of a portion of the instrument of FIGURE 4.
Figure 7:
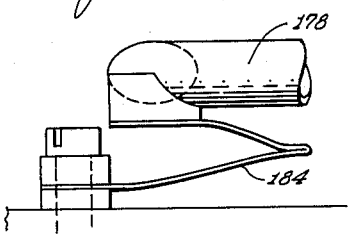
FIGURE 7 is a fragmentary cross-sectional view taken substantially along the plane of line 7—7 of FIGURE 4.

By stabilizing the temperature of the entire liquid 210 at a predetermined level, all of the operative elements of the instrument 130 will be retained at a constant fixed temperature. This will prevent any instabilities or inaccuracies resulting from dimensional and other changes produced by temperature changes. Accordingly, in the present instance, a temperature control circuit 214 is provided. The circuit 214 for regulating the temperature is shown in FIGURE 8. This circuit 214 employs a thermistor 216 as the temperature sensing element. The resistance of the thermistor 216 will be a function of its temperature. Accordingly, by employing the thermistor as one side of a resistive Wheatstone bridge 218, the bridge 218 may be unbalanced and provide a signal proportional to the temperature. The thermistor 216 is preferably located substantially at the geometric or mass center of the instrument, for example, on or about the channel sections 142 so as to be closely responsive to the temperature of the overall instrument. A plurality of heating elements 220, 224 and 226 are provided in the circuit 214 so as to be responsive to the amount of unbalance of the bridge. One of these heater elements 220 may be disposed between the lower extremities of the elements suspended from the cover 134 and the bottom of the housing 132. A pair of heaters 224 and 226 may be symmetrically disposed between the elements and the cover 134. As a result, the temperature of the liquid between the heaters 220, 224 and 226, i.e., the portion containing the operative elements, will be substantially constant. Moreover, since the elements and heaters are all symmetrically disposed, the corresponding parts will be identical isothermal lines and will have identical temperatures.

It will thus be seen that an instrument 130 has been provided which will be effective to measure the difference between a pair of forces and to produce a visual indication of the amount of this difference with a high degree of precision and repeatability. Although the present invention has been described in connection with a limited number of embodiments, it will be readily apparent to persons skilled in the art that numerous changes and modifications may be made thereto without departing from the spirit of the invention and that the instrument may be used for measuring any type of force. Accordingly, the foregoing disclosure and description is for illustrative purposes only and does not in any way limit the invention which is defined only by the claims which follow.

What is claimed is:

1. In a device of the class described, the combination of:
    a beam supported for swinging about an axis and having a load-bearing portion for producing a first moment on said beam proportional to the amount of load on said portion,
    at least one variable capacitance operatively interconnected with said beam and movable therewith to vary said capacitance as said beam moves,
    a free-running multivibrator for generating at least one train of squarewaves, said capacitance being disposed in said multivibrator and effective to determine the durations of said squarewaves,
    means responsive to the durations of said wavetrain and operatively interconnected with said beam for applying a second moment to said beam that is equal and opposite to said first moment and including an output means to apply a signal indicative of the amount of load on said portion to an indicator.

2. In a device of the class described, the combination of:
    a beam supported for swinging about an axis and having a load-bearing portion for producing a first moment on said beam proportional to the amount of load on said portion,
    at least one pair of electrically conductive plates disposed adjacent said beam, at least one of the plates being mounted on said beam and movable therewith and the other of said plates being spaced therefrom in a fixed position so that motion of said beam will vary the capacitance between the plates,
    a free-running multivibrator for generating at least one train of squarewaves, said capacitance being disposed in said multivibrator and effective to determine the durations of said squarewaves,
    means responsive to the durations of said wavetrains to produce an error signal proportional to said capacitance,
    means responsive to said error signal and operatively interconnected with said beam for applying a second moment to said beam that is equal and opposite to said first moment and including an output means to apply a signal indicative of the amount of load on said portion to an indicator.

3. In a device of the class described, the combination of:
    a beam supported for swinging about an axis and having a pair of load-bearing portions for producing a resultant moment on said beam proportional to the difference between the loads on said portions,
    a pair of electrically conductive plates at each end of said beam, at least one of the plates in each pair being mounted on said beam and movable therewith, and the other plate in said pair being spaced therefrom so that motion of said beam will vary the capacitances between the plates in each pair,
    a free-running multivibrator for generating a pair of trains of squarewaves, said capacitances being disposed in said multivibrator to control the oscillation thereof and effective to determine the durations of said squarewaves,
    means responsive to the durations of said wavetrains to produce an error signal proportional to said capacitances,
    means responsive to said error signal and operatively interconnected with said beam for applying a second moment to said beam that is equal and opposite to said first moment, means connected to the last named means to provide an output signal representative of the difference between the loads encountered by the load-bearing portions of said beam.

4. In a device of the class described, the combination of:
    a beam pivotally supported for swinging about an axis and having a load-bearing portion for producing a first moment on said beam proportional to the amount of load on said portion,
    a pair of electrically conductive plates at each end of said beam, at least one of the plates in each pair being mounted on said beam and movable therewith and the other plate in said pair being spaced therefrom so that the motion of said beam will vary the capacitances between the plates in each pair,
    a free-running multivibrator for generating a pair of wavetrains, said capacitances being effective to determine the durations of said wavetrains, means responsive to the difference in the durations of said wavetrains to produce an error signal consisting of a pair of currents having a fixed total but a difference proportional to the displacement of said beam, means responsive to the difference between said currents and operatively interconnected with said beam for applying a second moment to said beam that is equal and opposite to said first moment and including an output means to apply a signal indicative of the amount of load on said portion to an indicator.

5. In a device of the class described, the combination of:

a beam supported for swinging about an axis and having at least one load-bearing portion for producing a first moment on said beam proportional to the amount of load on said portion, a pair of plates positioned to form a capacitance, one of said plates being mounted on said beam to move therewith toward and away from the other of said plates so that the amount of capacitance between said plates will vary in response to movement of said beam, a free-running multivibrator for generating at least one train of squarewaves, said capacitance being disposed in said multivibrator to control the durations of said squarewaves, means for integrating said squarewaves to provide a D.C. signal proportional to the difference of the durations of said squarewaves, means responsive to said D.C. signal for producing a second moment on said beam equal and opposite to said first moment and including an output means to apply a signal indicative of the amount of load on said portion to an indicator.

6. In a device of the class described, the combination of:

a beam supported for swinging about an axis and having a pair of load-bearing portions for producing a first moment on said beam proportional to the difference between the loads on said portions, a pair of electrically conductive plates disposed on each end of said beam and spaced to form a pair of capacitances, at least one of said plates in each pair being mounted on said beam and movable therewith so that the motion of said beam will vary said capacitances, a free-running multivibrator for generating a pair of trains of squarewaves, said capacitances being disposed in said multivibrator to control the durations of said squarewaves, means for integrating said squarewaves for producing a pair of D.C. signals having a difference therebetween proportional to the durations of said squarewaves, means operatively interconnected with said beam and responsive to said D.C. signals for producing a second moment on said beam equal and opposite to said first moment, means connected to the last named means to provide an output signal representative of the difference between the loads encountered by the load-bearing portions of said beam.

7. In a device of the class described, the combination of:

a beam supported for swinging about an axis and having two load-bearing portions effective to produce first and second oppositely directed moments on said beam, each moment being proportional to the amount of load respectively applied to said two load-bearing portions, means for producing a balancing moment on said beam in opposition to one of said first and second moments, oscillator means for producing two trains of pulses having opposite phase relationship, two pairs of electrically conductive plates in said oscillator means defining two capacitors respectively determining the durations of the pulses of said trains of pulses, one of said plates of each pair being mounted on said beam for movement therewith in respective response to said first and second moments so that the motion of said beam will oppositely vary the capacitances of said two pairs of plates, thereby oppositely varying the pulse durations of said two trains of pulses, means responsive to said capacitors for actuating said first means so that said balancing moment will be equal and opposite to the difference between said first and second moments, means connected to the last named means to provide an output signal representative of the difference between the loads encountered by the load-bearing portions of said beam.

8. In a device of the class described, the combination of:

a beam pivotally supported for swinging about an axis and having a load-bearing portion for producing a first moment on said beam proportional to the amount of load on said portion, a pair of electrically conductive plates at each end of said beam, at least one of the plates in each pair being mounted on said beam and movable therewith and the other plate in said pair being spaced therefrom so that the motion of said beam will vary the capacitances between the plates in each pair, a free-running oscillator for generating a pair of wavetrains in phase opposition, said capacitances individually determining the durations of the pulses of said wavetrains, means responsive to the difference in the durations of said wavetrains to produce an error signal consisting of a pair of currents having a fixed total but a difference proportional to the displacement of said beam, means responsive to the difference between said currents and operatively interconnected with said beam for applying a second moment to said beam that is equal and opposite to said first moment and including an output means to apply a signal indicative of the amount of load on said portion to an indicator.

References Cited by the Examiner
UNITED STATES PATENTS

| | | | |
|---|---|---|---|
| 2,117,894 | 5/1938 | Lenehan | 73—398 |
| 2,512,372 | 6/1950 | Pakala | 331—65 X |
| 2,599,777 | 6/1952 | Pierce | 360—69 X |
| 2,617,305 | 11/1952 | Dahn et al. | 73—384 |
| 2,639,858 | 5/1953 | Hayes | 331—65 X |
| 2,715,339 | 8/1955 | Honig | 73—398 X |
| 3,079,792 | 3/1963 | Hubbs | 73—141 |

LOUIS R. PRINCE, *Primary Examiner.*

RICHARD QUEISSER, *Examiner.*